United States Patent Office 2,898,367
Patented Aug. 4, 1959

2,898,367

SYNTHESIS OF ESTERS OF LOWER ALIPHATIC ALCOHOLS

Lawrence G. Hess and Helmut W. Schulz, Charleston, W. Va., assignors to Union Carbide Corporation, a corporation of New York No Drawing. Application August 5, 1957
Serial No. 676,444

8 Claims. (Cl. 260—488)

This invention relates to the synthesis of organic oxygen-containing compounds, and, more particularly to the synthesis of oxygen-containing compounds by the reaction of alcohols and carbon monoxide in the presence of suitable catalysts. More specifically, this invention is directed to a vapor phase process for the preparation of esters of lower aliphatic alcohols by the reaction of a lower aliphatic alcohol and carbon monoxide. The reaction whereby the esters of lower aliphatic alcohols are obtained in accordance with this invention may be written as follows:

$$2R\text{---}OH + CO \rightarrow R\text{---}COOR + H_2O$$

wherein R represents a lower aliphatic hydrocarbon radical.

As is well known when carbon monoxide is reacted with an alcohol a variety of carbonylated products are produced including esters, acids, ethers and the like. It has been discovered that when carbon monoxide and an alcohol are reacted at elevated temperatures and pressures in the presence of a nickel or nickel carbonyl catalyst promoted with a minor amount of hydrogen iodide there is produced a reaction mixture wherein the carbonylated product is predominately the ester of a lower aliphatic monohydric alcohol.

Considerable work has been done in the field to which this invention relates, and, as a consequence, there are a great number of patents and literature publications outstanding which describe the reaction of methanol and carbon monoxide in the presence of various catalysts. The reactions described in the prior art were principally liquid phase processes and produced various products including, for example, acetic acid, methyl acetate and other oxygen-containing products, all in low productivity based on the raw material charged. It has been found that by employing the catalyst-promoter combinations of this invention in an essentially vapor phase process we have been able to obtain the esters of lower aliphatic alcohols in high productivity when carbon monoxide and a lower aliphatic monohydric alcohol are reacted in the presence of these catalysts under the reaction conditions provided for by this invention.

Heretofore, it has been known that methyl acetate, as well as other simple esters in the case of the appropriate alcohol, can be prepared by the reaction of carbon monoxide and methanol in the presence of certain catalysts, such as for example the ferrites, ferrates, cobaltites and cobaltates of the alkali and alkaline earth metals, including sodium, potassium, barium, calcium, magnesium and aluminum. It has also been known that the lower aliphatic alcohols may react with carbon monoxide to form either the carboxylic acid or the esters in the presence of catalysts, such as the oxides, acetates and methylates of the heavy metals, such as for example copper, tin, lead and zinc, or mixtures thereof. Furthermore, it has been known heretofore that methyl acetate can be prepared by the reaction of methanol and carbon monoxide in the presence of a volatile halide of boron, such as borontrifluoride, and the like. Also, various silicotungstates, borates and phosphates have been used as catalysts for the reaction. Nickel and cobalt halides have been mentioned as substances which may be employed in combination with boron trifluoride, or activated carbon as catalysts for the reaction, according to the prior art.

In general, the aforementioned processes for the reaction of methanol and carbon monoxide were liquid phase processes and either involved the use of highly corrosive catalysts, or gave rise to comparatively low yields of the desired end products, such as acetic acid, or methyl acetate.

Therefore, it is an object of this invention to provide an improved process for reacting alcohols with carbon monoxide to produce esters of higher molecular weight in high productivity.

It is a further object of this invention to provide a novel process for the production of esters of lower aliphatic alcohols to the substantial exclusion of other oxygenated products formed during the reaction. A still further object of this invention is to provide a novel process for reacting carbon monoxide and a lower aliphatic monohydric alcohol to produce a reaction mixture comprising essentially the carbonylated product in the form of an ester of the particular lower aliphatic monohydric alcohol.

It has been discovered that when a lower aliphatic monohydric alcohol and carbon monoxide are reacted together in the presence of a catalyst comprising nickel carbonyl or nickel and promoted with a minor amount of hydrogen iodide, there is obtained an ester of the lower aliphatic monohydric alcohol in high yields. Additionally, when the catalysts of this invention are used, the reaction may be directed preferentially to the formation of methyl acetate rather than acetic acid.

The process of this invention is carried out at a temperature not substantially lower than 325° C. Essentially, the reaction is a vapor phase reaction, since the preferred operating temperature range (325° C. to 400° C.) is above the critical temperatures of the alcohol, ester and acid. Superatmospheric pressures are generally employed while pressures ranging upwards of 3000 pounds per square inch are preferable. Most advantageous results are obtained when operating in a pressure range of from about 4000 pounds per square inch to about 6000 pounds per square inch.

Catalyst concentrations are important in the practice of this invention only to the extent that enough catalyst should be present to promote the carbonylation of the alcohol. Catalyst concentrations in the range of abut 0.5 perceont to about 2 percent, by weight, of nickel or nickel carbonyl, based on the quantity of alcohol charged to the reaction, are usually sufficient to promote the reaction.

The amount of promoter is not necessarily critical but should be present in an amount sufficient to activate the catalyst. A preferred range of promoter concentration is an amount in the range of about 10 percent to about 50 percent, by weight, based on the weight of catalyst charged to the reaction.

In the practice of the invention the mol ratio of carbon monoxide to lower aliphatic monohydric alcohol is not necessarily critical and can be varied over a wide range. It has been found that suitable conversions of alcohol to esters can be obtained when the mol ratio of carbon monoxide to alcohol is varied from as low as 0.63:1 to as high as 2.07:1. It is preferred however to operate the process of this invention wherein the mol ratio of carbon monoxide to alcohol is maintained in the range of from 1:1 to about 1.5:1.

Broadly stated, this invention is directed to a process for the production of organic oxygen-containing compounds which comprises reacting a saturated aliphatic monohydric alcohol with carbon monoxide in the presence of a catalytic quantity of nickel or nickel carbonyl promoted with a minor amount of hydrogen iodide and separating, from the resulting reaction mixture, the organic oxygen-containing compounds produced by the reaction. More specifically, this invention is directed to a process for the production of methyl acetate, which comprises reacting methanol and carbon monoxide at an elevated temperature in the range of 325° C. to 400° C. and at an elevated pressure in the range of from about 4000 pounds per square inch to about 6000 pounds per square inch in the presence of a catalytic quantity of nickel or nickel carbonyl promoted with a minor amount of hydrogen iodide.

The carbonylation reaction may be carried out, either continuously or by batch process, as desired.

In a batch-type process, for example, the carbonylation of methanol was carried out in a rocker-type reaction vessel similar to those used in established techniques for laboratory hydrogenations. In some experiments, removable glass liners were employed.

After the reaction vessel had been charged with liquid and solid components, it was closed and placed in the heating and rocking mechanism, which was suitably fitted with the necessary auxiliary equipment. Carbon monoxide was introduced into the reaction vessel at approximately 500 pounds per square inch and expelled from the vessel three times to insure a complete purging of the system. Reaction gas was then added up to the pressures calculated from the gas law relationships to give the desired total pressure at the approximate expected temperature of reaction. The calculations were modified as suggested by the data obtained in the course of the experiments.

Next, rocking and heating were initiated in a manner which would result in minimum exposure to warm-up period and yet would not result in temperatures excessively above the desired operating temperature. When the reaction conditions had been maintained for the required period of time, heating was discontinued and a stream of air was passed around the reaction vessel (inside the heater) to facilitate rapid cooling of the reaction vessel and its contents to approximately 50° C. This cooling air was also used to help control the exothermic reactions.

When low boiling components were expected in the reaction product a blowdown procedure was used which involved chilling the reaction vessel in acetone-solid carbon dioxide slurry prior to bleeding the gas. The gas was discharged through a fifty-foot copper coil and cold traps cooled with acetone-solid carbon dioxide slurry, then passed through a gas sample tube and measured finally with a wet-test gas meter. If a glass liner was used, separate weights were obtained on the material recovered inside the liner and the material removed from the bomb outside the liner, both portions being combined for distillation and analysis. A complete analysis was obtained by fractional distillation, followed by a chemical analysis of the fractions, which permitted calculation of the data presented in the following example illustrating a method of practicing the invention.

EXAMPLE I

Methyl acetate was produced when a mixture of 235 grams of methanol, 5 grams of nickel carbonyl and 0.7 gram of hydrogen iodide were charged to a pressure-resistant reaction vessel and heated under a carbon monoxide pressure of 4500 pounds per square inch at a temperature in the range of 350° C. to 366° C. for a period of fifteen minutes. Distillation of the crude reaction product discharged from the crude reaction vessel gave fractions which through chemical and mass spectrometric analyses demonstrated a 45 percent yield of methyl acetate, based on the quantity of methanol charged to the reaction vessel.

In a similar manner ethyl propionate may be prepared from ethanol, since there is no difference involved in the manipulative procedure.

The following Table I illustrates a series of continuous flow experiments in which nickel was used as a catalyst with hydrogen iodide as the promoter. Carbon monoxide was supplied from standard shipping cylinders and delivered to the reactor, which was equipped with a Dowtherm heating jacket, at 4500 pounds per square inch pressure by means of a high pressure gas compressor. Methanol containing 0.2 percent hydrogen iodide was supplied by a high-pressure liquid pump. The carbon monoxide and methanol were mixed just prior to entry at the top of the reactor. The reaction mixture then passced through a section of the reactor packed with 3/16 inch Aloxite pellets which served as a vaporizer and preheater. The reaction mixture then passed through the catalyst bed of the reactor, the nickel catalyst being supported on 3/16 inch "Alfrax" pellets. A thermowell inserted from the bottom of the reactor permitted measurements of the temperature throughout the catalyst bed. The reaction products passed out of the reactor, through an expansion valve (pressure controller), where the pressure was reduced from 4500 pounds per square inch to approximately 22 pounds per square inch through an ice-cooled coil condenser and to a liquid separator vessel, where the liquid products were collected and measured periodically. The off-gas from the liquid separator passed through a back-pressure regulator (pressure reduced to atmospheric), through a coil condenser cooled with solid carbon dioxide-acetone slurry, through a gas sampling tube, and finally through a wet-test gas meter. The slight back pressure of 22 pounds per square inch was beneficial in the condensation of the low boiling products. The liquid product was analyzed chemically each hour to determine the methyl acetate content as a method of following the conversion of methanol. The temperature of the Dowtherm jacket was maintained at 348° C. throughout each experiment. The incoming reaction mixture was heated to 348° C. at the end of the preheating section and was then raised by the heat of the reaction to 357° C. after traveling a short distance through the catalyst section. The temperature of 357° C. was maintained substantially throughout the catalyst section. A complete analysis of the liquid products and the blowoff gas, together with the liquid feed rate and gaseous blowoff rate, permitted calculation of the data presented in Table I.

Table I

CONTINUOUS FLOW EXPERIMENTS [a]

| Run | Catalyst and Promoter | Inlet Space Velocity,[d] (v./v. hour) | | Mol Ratio, CO/CH₃OH | Duration of Run (hrs.) | Methanol Conversion, Percent | Efficiencies (Percent) | | | |
|---|---|---|---|---|---|---|---|---|---|---|
| | | CO | CH₃OH | | | | Total | Methyl Acetate | Acetic Acid | Dimethyl Ether |
| 1 | Nickel [b] / Hydrogen Iodide [c] | 768 | 0.98 | 1.3:1 | 4.0 | 69.7 | 87.5 | 68.0 | 6.1 | 13.4 |
| 2 | Nickel [b] / Hydrogen Iodide [c] | 386 | 0.49 | 1.4:1 | 1.0 | 77.3 | 97.1 | 74.1 | 10.4 | 12.6 |
| 3 | Nickel [b] / Hydrogen Iodide [c] | 288 | 0.49 | 1.0:1 | 1.0 | 79.7 | 87.4 | 68.2 | 9.4 | 9.8 |
| 4 | Nickel [b] / Hydrogen Iodide [c] | 452 | 0.50 | 1.5:1 | 5.5 | 71.2 | 69.4 | 62.3 | 5.9 | 1.2 |

[a] Reactions conducted at a pressure of 4500 pounds per square inch and at a temperature in the range of 350° C. to 357° C.
[b] Nickel supported on 3/16 inch "Alfrax" pellets. (Percent Ni by weight=7.0 percent.)
[c] Hydrogen Iodide introduced as a 0.2 percent solution in the methanol.
[d] Space velocity of carbon monoxide expressed as liters of gas at standard conditions per liter of catalyst per hour. Space velocity of methanol expressed as liters of liquid at standard conditions per liter of catalyst per hour.

EXAMPLE II

Methyl acetate was produced when carbon monoxide and methanol were reacted in a ratio of 0.63:1. A mixture of 316 grams of methanol, 7 grams of nickel carbonyl, and 1.2 grams of hydrogen iodide were charged to a pressure-resistant reaction vessel and heated under a carbon monoxide pressure of 6400 pounds per square inch at a temperature in the range of 344° C. to 353° C. for a period of 18 minutes. Distillation of the crude reaction product discharged from the reaction vessel gave fractions which through chemical and mass spectrometric analyses demonstrated a 52.7 percent yield of methyl acetate and a 0.85 percent yield of acetic acid, based on the quantity of methanol charged to the reaction vessel.

EXAMPLE III

Methyl acetate was produced when carbon monoxide and methanol were reacted in a ratio of 2.07:1. A mixture of 117 grams of methanol, 2.5 grams of nickel carbonyl, and 0.3 gram of hydrogen iodide were charged to a pressure-resistant reaction vessel and heated under a carbon monoxide pressure of 4950 pounds per square inch at a temperature in the range of 350° C. to 365° C. for a period of 30 minutes. Distillation of the crude reaction product discharged from the reaction vessel gave fractions which through chemical and mass spectrometric analyses demonstrated a 61.2 percent yield of methyl acetate and a 10 percent yield of acetic acid, based on the quantity of methanol charged to the reaction vessel.

This application is a continuation-in-part of application Serial No. 398,864, filed December 17, 1953, now abandoned.

What is claimed is:

1. A process for the production of esters of lower alkanols wherein the ester formed contains one more carbon atom than the sum of the carbon atoms of two alkanol molecules which comprises reacting a lower alkanol with carbon monoxide in the presence of a catalyst selected from the group consisting of nickel and nickel carbonyl and promoted with a minor amount of hydrogen iodide, at a temperature in the range of from 325° C. to 400° C. and under superatmospheric pressures in the range of from 3000 to 6000 pounds per square inch absolute, and separating from the resultant reaction mixture the esters of the lower aliphatic alcohols.

2. A process for the production of esters of lower alkanols wherein the ester formed contains one more carbon atom than the sum of the carbon atoms of two alkanol molecules which comprises reacting a lower alkanol with carbon monoxide in the presence of a catalyst consisting of nickel promoted with a minor amount of hydrogen iodide, at a temperature in the range of from 325° C. to 400° C. and under superatmospheric pressures in the range of from 3000 to 6000 pounds per square inch absolute, and separating from the resultant reaction mixture the esters of the lower aliphatic alcohols.

3. A process for the production of esters of lower alkanols wherein the ester formed contains one more carbon atom than the sum of the carbon atoms of two alkanol molecules which comprises reacting a lower alkanol with carbon monoxide in the presence of a catalyst consisting of nickel carbonyl promoted with a minor amount of hydrogen iodide, at a temperature in the range of from 325° C. to 400° C. and under superatmospheric pressures in the range of from 3000 to 6000 pounds per square inch absolute, and separating from the resultant reaction mixture the esters of the lower aliphatic alcohols.

4. A process for the production of esters of lower alkanols wherein the ester formed contains one more carbon atom than the sum of the carbon atoms of two alkanol molecules by effecting the reaction of carbon monoxide with a lower alkanol at an elevated temperature in the range of from 325° C. to 400° C. and under superatmospheric pressures in the range of from 3000 to 6000 pounds per square inch absolute, the improvement which comprises effecting the reaction in the presence of a catalyst selected from the group consisting of nickel and nickel carbonyl promoted with a minor amount of hydrogen iodide.

5. A process for the production of methyl acetate which comprises reacting methanol and carbon monoxide under superatmospheric pressures in the range of from 3000 to 6000 pounds per square inch absolute and at a temperature in the range of from 325° C. to 400° C. in the presence of a catalyst consisting of nickel carbonyl promoted with hydrogen iodide.

6. A process for the production of ethyl propionate which comprises reacting ethanol and carbon monoxide under superatmospheric pressures in the range of from 3000 to 6000 pounds per square inch absolute and at a temperature in the range of from 325° C. to 400° C. in the presence of a catalyst consisting of nickel carbonyl promoted with hydrogen iodide.

7. A process for the production of methyl acetate which comprises reacting methanol and carbon monoxide under superatmospheric pressures in the range of from 3000 to 6000 pounds per square inch absolute and at a temperature in the range of from 325° C. to 400° C. in the presence of a catalyst consisting of nickel promoted with hydrogen iodide.

8. A process for the production of ethyl propionate which comprises reacting ethanol and carbon monoxide under superatmospheric pressures in the range of from 3000 to 6000 pound per square inch absolute and at a temperature in the range of from 325° C. to 400° C. in the presence of a catalyst consisting of nickel promoted with hydrogen iodide.

(References on following page)

References Cited in the file of this patent

UNITED STATES PATENTS

| | | |
|---|---|---|
| 2,650,245 | Thomas et al. | Aug. 25, 1953 |
| 2,710,878 | Glasebrook | June 14, 1955 |
| 2,739,169 | Hagemeyer | Mar. 20, 1956 |

OTHER REFERENCES

Fiat Final Report 933, October 17, 1946, page 7.
Reppe: "Acetylene Chemistry," P.B. Report—18852-5, pages 171–173.

UNITED STATES PATENT OFFICE
CERTIFICATE OF CORRECTION

Patent No. 2,898,367                                                        August 4, 1959

Lawrence G. Hess et al.

It is hereby certified that error appears in the printed specification of the above numbered patent requiring correction and that the said Letters Patent should read as corrected below.

Column 3, line 9, for "abut" read -- about --; line 10, for "perceont" read -- percent --; column 4, line 43, for "passced" read -- passed --; column 6, line 34, for "A" read -- In a --; line 70, for "pound" read -- pounds --.

Signed and sealed this 12th day of April 1960.

(SEAL)
Attest:

KARL H. AXLINE
Attesting Officer

ROBERT C. WATSON
Commissioner of Patents